(12) United States Patent
Swengler

(10) Patent No.: US 11,310,343 B2
(45) Date of Patent: Apr. 19, 2022

(54) USER AND USER DEVICE REGISTRATION AND AUTHENTICATION

(71) Applicant: Paul Swengler, Inverness, FL (US)

(72) Inventor: Paul Swengler, Inverness, FL (US)

(*) Notice: Subject to any disclaimer, the term of this patent is extended or adjusted under 35 U.S.C. 154(b) by 0 days.

(21) Appl. No.: 17/221,066

(22) Filed: Apr. 2, 2021

(65) Prior Publication Data
US 2021/0273803 A1    Sep. 2, 2021

Related U.S. Application Data

(63) Continuation of application No. 16/531,007, filed on Aug. 2, 2019, now Pat. No. 11,005,971.

(60) Provisional application No. 62/713,926, filed on Aug. 2, 2018.

(51) Int. Cl.
| | |
|---|---|
| *H04W 12/06* | (2021.01) |
| *G06F 21/31* | (2013.01) |
| *H04L 67/00* | (2022.01) |
| *H04L 29/06* | (2006.01) |
| *H04L 67/303* | (2022.01) |
| *G06F 16/13* | (2019.01) |

(Continued)

(52) U.S. Cl.
CPC ............ *H04L 67/34* (2013.01); *G06F 16/137* (2019.01); *G06F 21/31* (2013.01); *H04L 9/0866* (2013.01); *H04L 9/0869* (2013.01); *H04L 9/321* (2013.01); *H04L 63/0876* (2013.01); *H04L 63/18* (2013.01); *H04L 67/303* (2013.01); *H04W 12/06* (2013.01)

(58) Field of Classification Search
CPC ....... H04L 63/08–0892; H04L 9/00–38; H04L 63/06–0892; G06F 21/31–43; G06F 21/00–645; H04W 12/06–069
See application file for complete search history.

(56) References Cited

U.S. PATENT DOCUMENTS

| | | | | | |
|---|---|---|---|---|---|
| 5,821,933 | A | * | 10/1998 | Keller ................. | G06F 3/04817 715/741 |
| 5,867,163 | A | * | 2/1999 | Kurtenbach .............. | G06F 8/34 715/840 |

(Continued)

OTHER PUBLICATIONS

H. Zhao and X. Li, "S3PAS: A Scalable Shoulder-Surfing Resistant Textual-Graphical Password Authentication Scheme," 21st International Conference on Advanced Information Networking and Applications Workshops (AINAW'07), 2007, pp. 467-472, doi: 10.1109/AINAW.2007.317. (Year: 2007).*

*Primary Examiner* — Emmanuel L Moise
*Assistant Examiner* — Julian Chang
(74) *Attorney, Agent, or Firm* — Johnfar Kerlee

(57) ABSTRACT

A method of registering and authenticating a user and a user device is disclosed. In one embodiment, the method does not use any stored usernames, passwords, or tokens. In certain embodiments, the method stores algorithmic functions on the user device. When a user requests authentication a server provides variable values to the client device. The values are input into the algorithmic functions. The functions generate an output. The output is sent to the server. The server uses the client device generated output to authenticate the client device and the user. Each time the user requests authentication different variable values are used to prevent prediction and hacking of the system.

20 Claims, 8 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 6,138,237 | A * | 10/2000 | Ruben | G06F 21/10 713/162 |
| 6,754,820 | B1 * | 6/2004 | Scheidt | G06F 21/31 380/277 |
| 6,980,660 | B1 * | 12/2005 | Hind | H04W 12/069 380/282 |
| 7,779,130 | B1 * | 8/2010 | Toutonghi | H04L 67/06 709/227 |
| 8,336,086 | B2 * | 12/2012 | Seo | G06F 21/36 726/5 |
| 8,370,926 | B1 * | 2/2013 | Satish | G06F 21/36 726/19 |
| 8,392,975 | B1 * | 3/2013 | Raghunath | G06F 16/58 726/7 |
| 8,752,147 | B2 * | 6/2014 | Tamai | H04L 63/0838 726/6 |
| 8,756,672 | B1 * | 6/2014 | Allen | G06F 21/36 726/7 |
| 8,793,776 | B1 * | 7/2014 | Jackson | H04L 63/0853 726/7 |
| 8,844,012 | B1 * | 9/2014 | Chan | H04W 12/06 726/7 |
| 8,881,251 | B1 * | 11/2014 | Hilger | G06F 21/31 726/7 |
| 8,904,479 | B1 * | 12/2014 | Johansson | G06F 21/36 726/2 |
| 8,918,529 | B1 * | 12/2014 | Batchu | H04L 63/20 709/229 |
| 8,918,851 | B1 * | 12/2014 | Iannamico | G06F 21/36 726/7 |
| 9,032,501 | B1 * | 5/2015 | Martin | H04L 63/061 726/10 |
| 9,053,294 | B2 * | 6/2015 | Burkill | G06F 21/36 |
| 9,237,146 | B1 * | 1/2016 | Casillas | H04L 63/1408 |
| 9,397,838 | B1 * | 7/2016 | Chen | H04L 9/321 |
| 9,608,809 | B1 * | 3/2017 | Ghetti | H04L 9/0819 |
| 9,626,074 | B2 * | 4/2017 | Ding | G06F 21/36 |
| 9,792,424 | B1 * | 10/2017 | McClintock | G06F 21/40 |
| 10,127,376 | B1 * | 11/2018 | Robinson | G06F 21/36 |
| 10,153,897 | B1 * | 12/2018 | Jezewski | H04L 9/3013 |
| 10,169,566 | B1 * | 1/2019 | Mossoba | G06F 40/12 |
| 10,282,531 | B1 * | 5/2019 | Davey | G06F 21/42 |
| 10,642,484 | B1 * | 5/2020 | Hanada | G06F 3/04883 |
| 10,848,482 | B1 * | 11/2020 | Eisen | H04L 63/0853 |
| 10,999,331 | B1 * | 5/2021 | Marchand | H04L 65/1073 |
| 2002/0022895 | A1 * | 2/2002 | Genise | G05B 19/0426 700/83 |
| 2002/0184539 | A1 * | 12/2002 | Fukuda | H04W 12/06 726/21 |
| 2002/0188854 | A1 * | 12/2002 | Heaven | H04L 63/0861 713/186 |
| 2003/0154413 | A1 * | 8/2003 | Shigeeda | G06F 21/31 726/3 |
| 2003/0208684 | A1 * | 11/2003 | Camacho | G06Q 20/4014 713/186 |
| 2004/0030934 | A1 * | 2/2004 | Mizoguchi | G06F 21/36 726/18 |
| 2004/0230843 | A1 * | 11/2004 | Jansen | G06F 21/36 726/7 |
| 2005/0015594 | A1 * | 1/2005 | Ashley | G06F 21/40 713/168 |
| 2006/0036857 | A1 * | 2/2006 | Hwang | G06F 21/31 713/168 |
| 2007/0074119 | A1 * | 3/2007 | Komine | G06Q 20/3674 715/743 |
| 2007/0168657 | A1 * | 7/2007 | Carro | G06F 21/645 713/156 |
| 2007/0234043 | A1 * | 10/2007 | Miyazawa | H04L 9/3263 713/156 |
| 2008/0155267 | A1 * | 6/2008 | Lieber | H04L 9/321 713/183 |
| 2008/0209221 | A1 * | 8/2008 | Vennelakanti | H04L 63/06 713/183 |
| 2008/0244700 | A1 * | 10/2008 | Osborn | G06F 21/36 726/2 |
| 2008/0292101 | A1 * | 11/2008 | Macchi | H04L 63/0853 380/270 |
| 2009/0038006 | A1 * | 2/2009 | Traenkenschuh | G07C 9/33 726/21 |
| 2009/0119754 | A1 * | 5/2009 | Schubert | H04L 63/205 726/4 |
| 2010/0043062 | A1 * | 2/2010 | Alexander | G06F 21/36 726/6 |
| 2010/0107225 | A1 * | 4/2010 | Spencer | G06F 21/85 726/4 |
| 2010/0151822 | A1 * | 6/2010 | Medvinsky | H04W 12/033 455/410 |
| 2010/0180336 | A1 * | 7/2010 | Jones | H04L 9/3226 726/19 |
| 2010/0262824 | A1 * | 10/2010 | Keshavachar | H04L 9/3226 713/168 |
| 2010/0269040 | A1 * | 10/2010 | Lee | G06F 3/04817 715/702 |
| 2010/0332841 | A1 * | 12/2010 | Watts | G06F 21/36 713/182 |
| 2011/0030040 | A1 * | 2/2011 | Ronchi | H04L 63/0869 726/5 |
| 2011/0145927 | A1 * | 6/2011 | Hubner | G06F 21/123 726/26 |
| 2011/0162066 | A1 * | 6/2011 | Kim | G06F 21/36 726/18 |
| 2011/0296509 | A1 * | 12/2011 | Todorov | H04L 9/3271 726/7 |
| 2012/0005735 | A1 * | 1/2012 | Prasanna | G06F 21/36 726/7 |
| 2012/0079589 | A1 * | 3/2012 | Betouin | G06F 21/31 726/18 |
| 2012/0102551 | A1 * | 4/2012 | Bidare | G06F 21/36 726/4 |
| 2012/0159593 | A1 * | 6/2012 | Griffin | G06F 21/36 726/7 |
| 2012/0291108 | A1 * | 11/2012 | Talamo | H04L 9/3273 726/6 |
| 2013/0138968 | A1 * | 5/2013 | Yudkin | G06F 21/602 713/183 |
| 2013/0155076 | A1 * | 6/2013 | Wodka | H04N 21/6582 345/502 |
| 2013/0174240 | A1 * | 7/2013 | Bidare | H04L 63/08 726/7 |
| 2013/0174243 | A1 * | 7/2013 | Inatomi | H04L 63/0861 726/7 |
| 2013/0185778 | A1 * | 7/2013 | Tamai | H04L 63/08 726/6 |
| 2013/0212383 | A1 * | 8/2013 | Hallin | H04L 63/0823 713/158 |
| 2013/0230171 | A1 * | 9/2013 | Ivanchykhin | H04N 21/2347 380/259 |
| 2013/0268775 | A1 * | 10/2013 | Hawkins | G06F 21/602 713/189 |
| 2013/0311780 | A1 * | 11/2013 | Besehanic | H04L 9/3247 713/176 |
| 2013/0318352 | A1 * | 11/2013 | Ichikawa | H04L 9/08 713/171 |
| 2013/0318587 | A1 * | 11/2013 | Shamsspoor | H04L 63/0838 726/7 |
| 2014/0047565 | A1 * | 2/2014 | Baek | G06F 21/44 726/30 |
| 2014/0101588 | A1 * | 4/2014 | Chang | G06F 3/0482 715/769 |
| 2014/0149740 | A1 * | 5/2014 | Sato | H04L 9/006 713/158 |
| 2014/0164780 | A1 * | 6/2014 | Sakumoto | H04L 9/3247 713/176 |

(56) References Cited

U.S. PATENT DOCUMENTS

| | | | |
|---|---|---|---|
| 2014/0181956 A1* | 6/2014 | Ahn | G06F 21/46 726/18 |
| 2014/0201834 A1* | 7/2014 | Conforti | G06F 21/36 726/19 |
| 2014/0208100 A1* | 7/2014 | Kendall | H04L 9/0863 713/164 |
| 2014/0215601 A1* | 7/2014 | Rittle | G06F 21/36 726/16 |
| 2014/0250511 A1* | 9/2014 | Kendall | G06F 21/6281 726/6 |
| 2014/0289824 A1* | 9/2014 | Chan | G06F 16/113 726/5 |
| 2014/0366112 A1* | 12/2014 | Hamana | G06F 21/36 726/7 |
| 2015/0012988 A1* | 1/2015 | Jeng | G06F 21/36 726/7 |
| 2015/0047048 A1* | 2/2015 | Charugundla | G06F 21/84 726/26 |
| 2015/0089239 A1* | 3/2015 | Yang | G06F 21/34 713/184 |
| 2015/0135291 A1* | 5/2015 | Yang | H04L 9/3226 726/6 |
| 2015/0178490 A1* | 6/2015 | Tamboly | G06F 21/46 726/4 |
| 2015/0188902 A1* | 7/2015 | Yoakum | H04L 63/083 726/7 |
| 2015/0188916 A1* | 7/2015 | Yamada | G06F 21/32 726/6 |
| 2015/0205516 A1* | 7/2015 | Kuscher | G06F 3/04842 715/708 |
| 2015/0221151 A1* | 8/2015 | Bacco | G06K 9/00771 340/5.83 |
| 2015/0237038 A1* | 8/2015 | Grajek | H04L 67/10 726/8 |
| 2015/0254659 A1* | 9/2015 | Kulkarni | A61L 31/145 705/71 |
| 2015/0271177 A1* | 9/2015 | Mun | H04L 63/0853 726/7 |
| 2015/0302252 A1* | 10/2015 | Herrera | G06K 9/00281 382/117 |
| 2015/0349966 A1* | 12/2015 | Dimitrakos | H04L 63/0838 713/168 |
| 2015/0350210 A1* | 12/2015 | Thibadeau, Sr. | G06F 21/31 726/7 |
| 2015/0363607 A1* | 12/2015 | Yang | H04L 9/3226 713/165 |
| 2016/0006721 A1* | 1/2016 | Patel | G06Q 50/01 726/8 |
| 2016/0055322 A1* | 2/2016 | Thomas | H04L 63/0876 726/7 |
| 2016/0065570 A1* | 3/2016 | Spencer, III | H04L 63/0861 726/7 |
| 2016/0104154 A1* | 4/2016 | Milov | G06Q 20/4012 705/67 |
| 2016/0105290 A1* | 4/2016 | Khalil | H04L 63/0421 713/176 |
| 2016/0219036 A1* | 7/2016 | Devkar | H04L 63/083 |
| 2016/0234191 A1* | 8/2016 | Leong | G09C 5/00 |
| 2016/0241398 A1* | 8/2016 | Lewis | H04L 9/0891 |
| 2016/0241405 A1* | 8/2016 | Jeong | H04L 63/0428 |
| 2016/0352722 A1* | 12/2016 | Johri | G06Q 20/204 |
| 2016/0359874 A1* | 12/2016 | Black | H04L 63/18 |
| 2016/0373799 A1* | 12/2016 | Scovanner | H04N 21/4312 |
| 2017/0006471 A1* | 1/2017 | Kim | H04L 63/083 |
| 2017/0011393 A1* | 1/2017 | Hong | G06F 21/88 |
| 2017/0053125 A1* | 2/2017 | Savagaonkar | G06F 21/60 |
| 2017/0063932 A1* | 3/2017 | Hubbard | H04L 63/0861 |
| 2017/0070521 A1* | 3/2017 | Bailey | G06F 21/32 |
| 2017/0134363 A1* | 5/2017 | Grunin | G06F 21/33 |
| 2017/0250974 A1* | 8/2017 | Antonyraj | H04W 12/04 |
| 2017/0302648 A1* | 10/2017 | Ferrydiansyah | G06F 21/36 |
| 2017/0346815 A1* | 11/2017 | Andrews | H04L 63/0876 |
| 2017/0361792 A1* | 12/2017 | Lem | E05B 77/26 |
| 2017/0374551 A1* | 12/2017 | Shen | H04L 29/06 |
| 2018/0026983 A1* | 1/2018 | Jain | H04L 67/306 713/185 |
| 2018/0048464 A1* | 2/2018 | Lim | H04L 9/0822 |
| 2018/0048674 A1* | 2/2018 | Black | H04W 12/03 |
| 2018/0060555 A1* | 3/2018 | Boesen | H04W 12/06 |
| 2018/0123800 A1* | 5/2018 | Kim | H04L 9/3271 |
| 2018/0137291 A1* | 5/2018 | Ho | G06F 16/164 |
| 2018/0137512 A1* | 5/2018 | Georgiadis | H04L 9/3213 |
| 2018/0139208 A1* | 5/2018 | Ho | G06F 3/067 |
| 2018/0145833 A1* | 5/2018 | Lin | G06F 21/32 |
| 2018/0183776 A1* | 6/2018 | Chander | G06Q 30/0645 |
| 2018/0189468 A1* | 7/2018 | Shim | G06K 9/00006 |
| 2018/0203988 A1* | 7/2018 | Hamlin | G06F 3/04817 |
| 2018/0232506 A1* | 8/2018 | Kumar | G06F 3/0488 |
| 2018/0294965 A1* | 10/2018 | Yan | G10L 17/00 |
| 2018/0350173 A1* | 12/2018 | Smith | G06F 21/604 |
| 2018/0357411 A1* | 12/2018 | Krishnamurthy | G06F 21/44 |
| 2019/0050554 A1* | 2/2019 | Fiske | H04L 63/08 |
| 2019/0066100 A1* | 2/2019 | Nakamura | G06Q 20/24 |
| 2019/0068591 A1* | 2/2019 | Zhang | H04W 12/04 |
| 2019/0073671 A1* | 3/2019 | Fang | G06Q 20/341 |
| 2019/0074981 A1* | 3/2019 | Loreskar | H04L 9/0861 |
| 2019/0095655 A1* | 3/2019 | Krawczewicz | H04W 12/06 |
| 2019/0098016 A1* | 3/2019 | Jeon | H04L 9/3263 |
| 2019/0104233 A1* | 4/2019 | Miyai | H04N 1/4406 |
| 2019/0163894 A1* | 5/2019 | Nolan | G06F 21/36 |
| 2019/0205541 A1* | 7/2019 | Zimny | H04L 41/0893 |
| 2019/0305955 A1* | 10/2019 | Verma | H04L 63/18 |
| 2019/0318325 A1* | 10/2019 | Kadiwala | G07G 5/00 |
| 2019/0349755 A1* | 11/2019 | Maia | H04W 12/06 |
| 2019/0377861 A1* | 12/2019 | Whitney | G06F 21/36 |
| 2019/0394206 A1* | 12/2019 | Zezza | H04L 41/28 |
| 2020/0004948 A1* | 1/2020 | Zhu | G06F 21/36 |
| 2020/0007576 A1* | 1/2020 | Buhacoff | H04L 9/0825 |
| 2020/0028836 A1* | 1/2020 | Gandhi | H04L 41/046 |
| 2020/0100106 A1* | 3/2020 | Black | H04L 63/18 |
| 2020/0106769 A1* | 4/2020 | Ramian | H04L 63/0428 |
| 2020/0143074 A1* | 5/2020 | Steinberg | G06F 21/6218 |
| 2020/0259822 A1* | 8/2020 | Hong | G06Q 20/3829 |
| 2020/0401718 A1* | 12/2020 | Hennig | G06F 21/78 |
| 2021/0004448 A1* | 1/2021 | Lee | G06F 21/46 |
| 2021/0167962 A1* | 6/2021 | Wang | H04L 9/3247 |

\* cited by examiner

USER AND USER DEVICE REGISTRATION AND AUTHENTICATION

PRIORITY

This application claims priority to U.S. Provisional Patent Application Ser. No. 62/713,926, filed on Aug. 2, 2018, and to U.S. Non-provisional patent application Ser. No. 16/531,007, the disclosure of each application is hereby fully incorporated in its entirety herein by reference.

FIELD OF THE INVENTION

The disclosed invention pertains generally to computer security systems and more specifically to a system and method for verifying the identity of a user without passwords or tokens.

BACKGROUND OF INVENTION

Current online identity systems fail to provide adequate protection from espionage or cybercrime because they fail to conclusively verify that the user is the bona-fide owner of the credentials. Contemporary systems are all created on a variant of username and password. Though biometrics, such as audio, fingerprint, PIN and retina may offer more secure than mnemonics or passwords, they simply use another form of the same system substituting a bio measure for a password. It is clear from breaches at major retailers, government agencies and entertainment service providers that there is an inadequacy of all the underlying security and verification systems. That underlying defect is that all identification systems rely on a set of matched tokens, i.e. passwords, which are stored on the server. It is those stored files where the vulnerability lies.

Embodiments of the proposed methodology completely eliminate user name and password of identity while providing a higher quality of security by 1. transferring a portion of the authentication process to the user's device in such a way that copying the device files or user credentials would not allow a fraudulent user bona fide authentication, and 2. eliminate the need for the server to store a lists or files of user names and passwords. It is important to note there are no passwords or matching tokens in the system described.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a computerized method for authenticating a user device comprising generating, by a server computer, a first executable file set; wherein said first executable file set comprises one or more first algorithmic functions; wherein each of said one or more first algorithmic functions comprises one or more first variables; transferring, by said server computer, said first executable file set to a first client computer; receiving, by said first client computer, said first executable file set; generating, by said first client computer, a first login request; transmitting, by said first client computer, said first login request to said server computer; receiving, by said server computer, said first login request; generating, by said server computer, one or more first values in response to said first login request; transmitting, by said server computer, said one or more first values to said first client computer; replacing, by said first client computer, said one or more first variables with said one or more first values; executing, by said first client computer, said first executable file set; generating, by said first client computer, a first client computer result; transmitting, by said first client computer, said first client computer result to said server computer; receiving, by said server computer, said first client computer result; and determining, by said server computer, that execution of said first executable set results in said first client computer result.

The method may utilize any type of number of information in the variables of the function. The values generated by the server computer may be alphanumeric values, hexadecimal values, binary values, or any numerical or representative value.

The method may further comprise generating, by said first client computer, a second login request; transmitting, by said first client computer, said second login request to said server computer; receiving, by said server computer, said second login request; generating, by said server computer, one or more second values in response to said first login request, wherein said second values are not equal to said one or more first values; transmitting, by said server computer, said one or more second values to said first client computer; replacing, by said first client computer, said one or more first variables with said one or more second values; executing, by said first client computer, said first executable file set; generating, by said first client computer, a second client computer result; transmitting, by said first client computer, said second client computer result to said server computer; receiving, by said server computer, said second client computer result; determining, by said server computer, that execution of said first executable set results in said second client computer result.

The method may further comprise transmitting protected data from said server computer to said first client device computer after said server computer has determined that execution of said first executable set results in said second client computer result. The method may further comprise transmitting protected data from said server computer to said first client device computer after said server computer has determined that execution of said first executable set results in said first client computer result.

The computerized method may further comprise generating, by a server computer, a second executable file set; wherein said second executable file set comprises one or more second algorithmic functions; wherein each of said one or more second algorithmic functions comprises one or more second variables; transferring, by said server computer, said second executable file set to a second client computer; receiving, by said second client computer, said second executable file set; generating, by said second client computer, a second login request; transmitting, by said second client computer, said second login request to said server computer; receiving, by said server computer, said second login request; generating, by said server computer, one or more second values in response to said second login request; transmitting, by said server computer, said one or more second values to said second client computer; replacing, by said second client computer, said one or more second variables with said one or more second values; executing, by said second client computer, said second executable file set; generating, by said second client computer, a second client computer result; transmitting, by said second client computer, said second client computer result to said server computer; receiving, by said server computer, said first client computer result; and determining, by said server computer, that execution of said second executable set results in said second client computer result.

Additionally, the first executable file set may further comprise a plurality of first algorithmic functions, wherein said plurality of first algorithmic functions further comprises at least a first function and a second function. Here the method may further comprise generating on a display screen of said first client computer device a plurality of icons, wherein said plurality of icons respectively represent said plurality of first algorithmic functions; receiving, by said first client computer, a direction to execute said first function; executing, by said first client computer, said first function; receiving, by said first client computer, a direction to execute said second function; and executing, by said first client computer, said second function.

Additionally the one or more first values may further comprise at least a first value and a second value, wherein said one or more first variables further comprises at least a first variable and a second variable, wherein said first variable is contained in said first function, and wherein said second variable is contained in said second function. Here the method may further comprise replacing said first variable with said first value; and replacing said second variable with said second value.

The computerized method may further comprise generating, by said first client computer, a first function result; and generating, by said first client computer, a second function result. The method may further comprise inputting, by said first client computer device, said first function result into said second function. The computerized method may further comprise determining, by said server computer, that execution of said first executable set results in said first client computer result only if said client computer device received said direction to execute said first function prior to receiving said direction to execute said second function.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

The terms used herein have their standard ordinary meaning proscribed to them by those have ordinary skill in the art. The following terms carry those meanings, and, to the extent that they differ from the ordinary meaning, the following meanings:

UserName, also called login name, logon name, sign-in name, sign-on name: a unique sequence of characters used to identify a user and allow access to a computer system, computer network, or online account. A user name is defined as a name which is used to define a user. Usually this is unique on each server and often created by the user. It is further defined as a field in a database (User Name' field) and/or stored in a file of other user names either directly in its own file, in a database or in a shadow file. A user name is almost always paired with a password or passphrase.

Password, also called passphrase: a token which is used to verify the identity of a user. Usually this is unique to each user. Passwords may be redundant on any server and often are created by the user. It is further defined as a field in a database ("Password" field) and/or stored in a file of other user names or passwords either directly in its own file, as an entry in a database file or in a shadow file. A password or token may be a word, biometric information like a fingerprint or DNA, a dongle key, smart card, or by any type of digitally represented data, but it is always a token provided by the user to be matched and compared to a stored representation of the same.

User Names and Passwords are further defined as tokens, a general term covering any items which are stored on a server and used for comparison as example: User Name and Password which is sent by the user during the login and compared to the stored tokens for that user.

Figure 1:
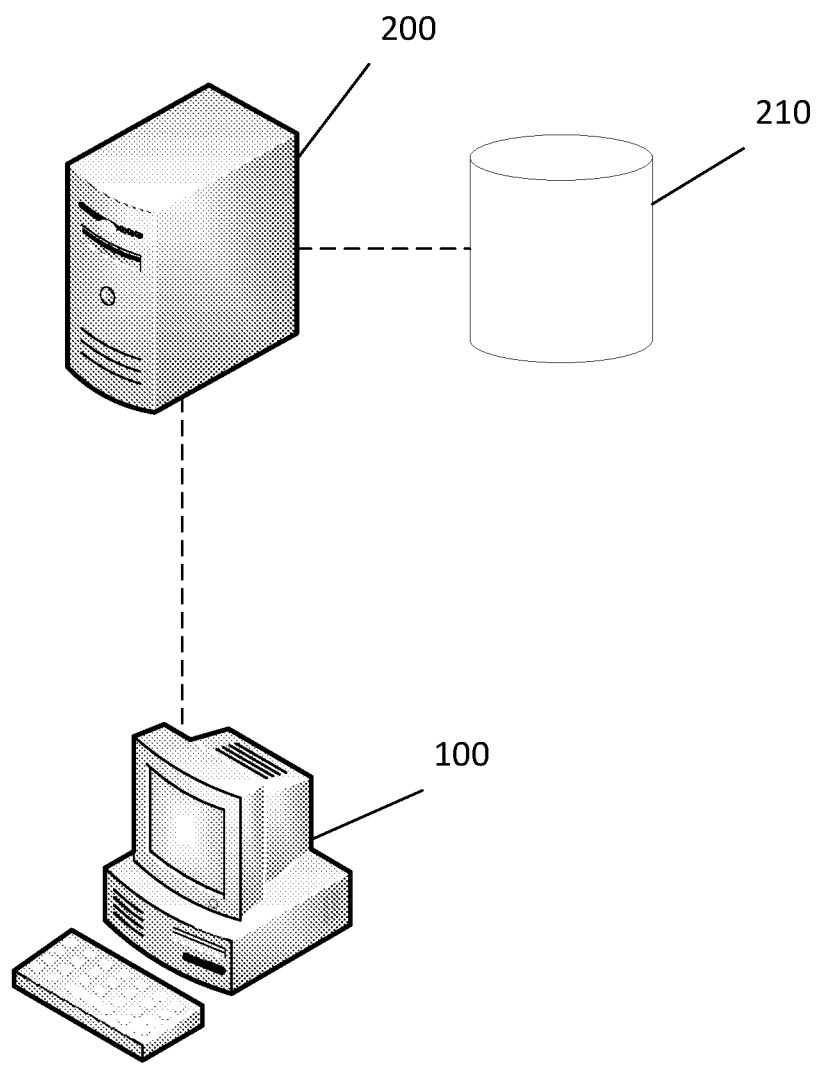
FIG. 1 is a schematic of the computer system performing the inventive method.

Referring to FIG. 1, the structure of the system is illustrated. The system comprises a client device 100, a server 200, and a database 210 connected to the server 200. The client device 100 may be any type of computerized device, such as a laptop computer, a desktop computer, a tablet computer, or a smart phone. The client device 100 is preferably connected to the server 200 through an internet connection but may also be connected through a direct wire connection. The database 210 stores any information and data for the server, such as remote storage files, but the database is not required by the system to permit a login to the system and is optional. The database 210 may be a standalone database which is separate from the server 200 or may be a component of the server 200.

Figure 2:
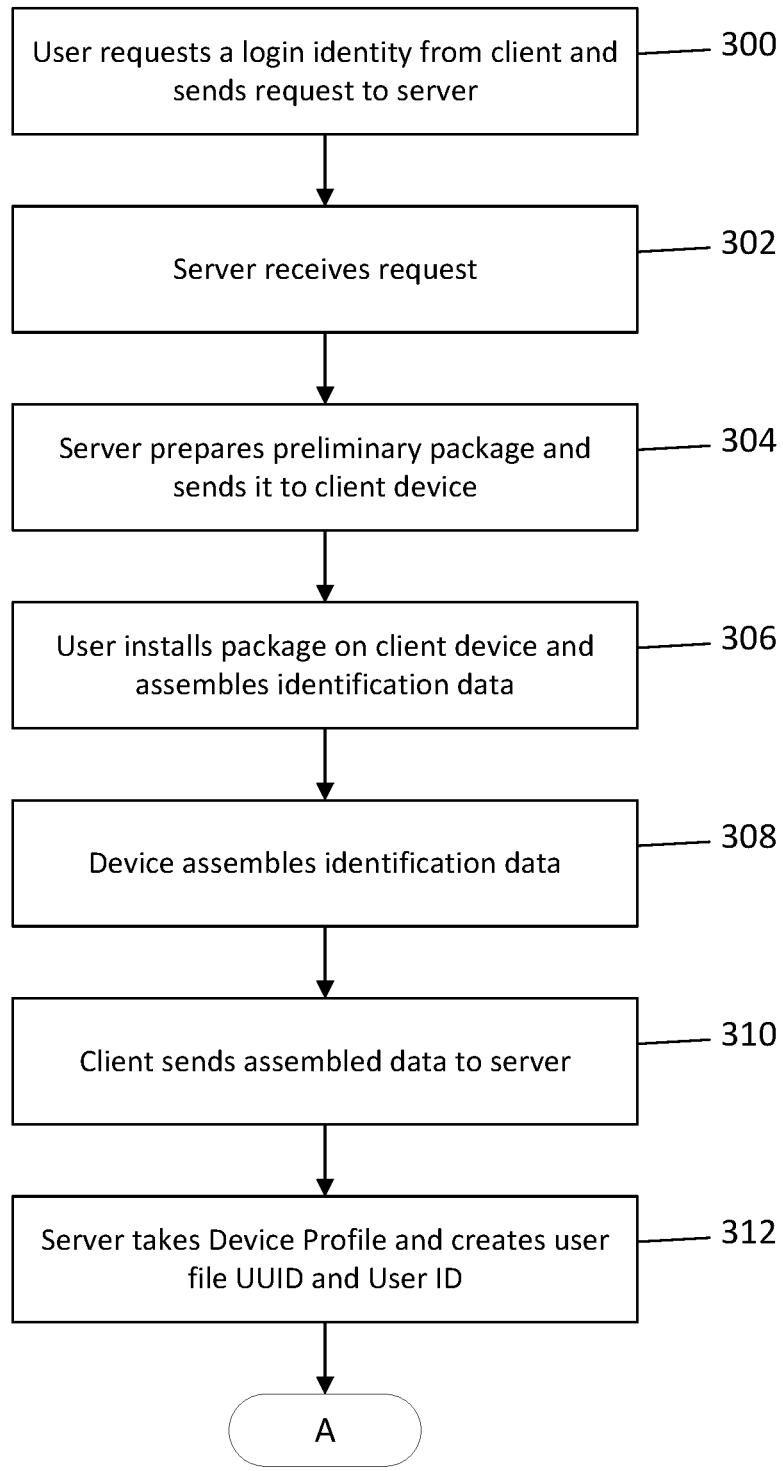
FIG. 2 is a schematic of the inventive method.
Figure 3:
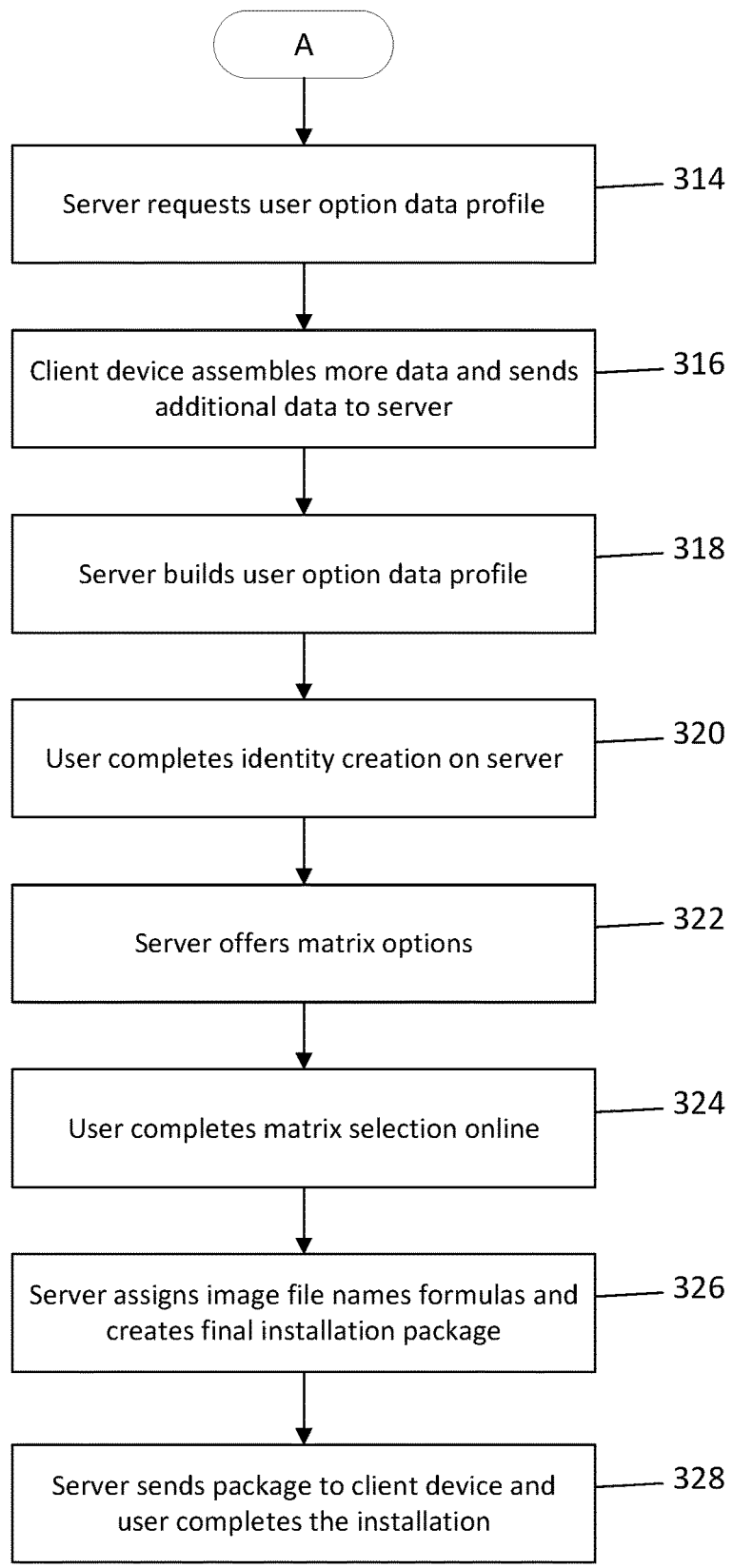
FIG. 3 is a schematic of the inventive method.

Referring to FIG. 2 and FIG. 3, the method of set up of the system is illustrated. The user first requests a login identity from the client device and sends the request to the server computer 300. The server receives this request 302. The server computer then prepares a preliminary package and sends the package to the client device 304. The user then installs the package on the client device and assembles the client identification data 306. The client device then assembles the identification data 308. The client computer then sends the assembled data to the server computer 310. The server takes the device profile and creates the user file UUID and User ID 312. In other embodiments the server utilizes the device profile as it is provided. The device profile, or device fingerprint, is any unique hardware configuration comprising and including any aggregation of, where available, IMEI, UUID, software or hardware device S/N, or the S/N of any component such as memory, OS, or serial numbers. The device profile may be comprised of any single one of these numbers or a combination of all of these numbers. The server requests user option data profile 318. The user completes the identity creation on the server 320. The server offers the user matrix login options 322. The user completes the matrix selection online 324. The server assigns the image file names formulas and creates the final installation package 326. The server sends the package to the client device and the user completes the installation 328.

Figure 5:
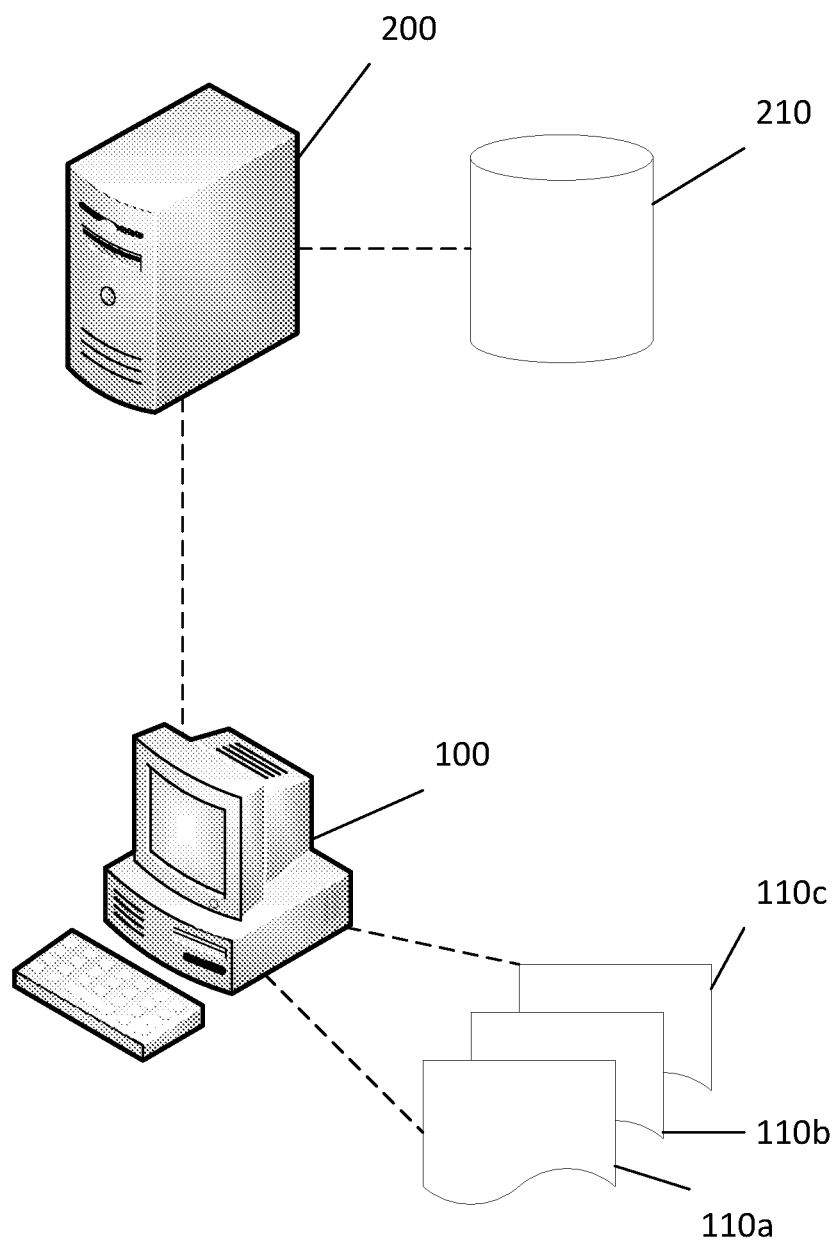
FIG. 5 is a schematic of the computer system performing the inventive method.
Figure 6:
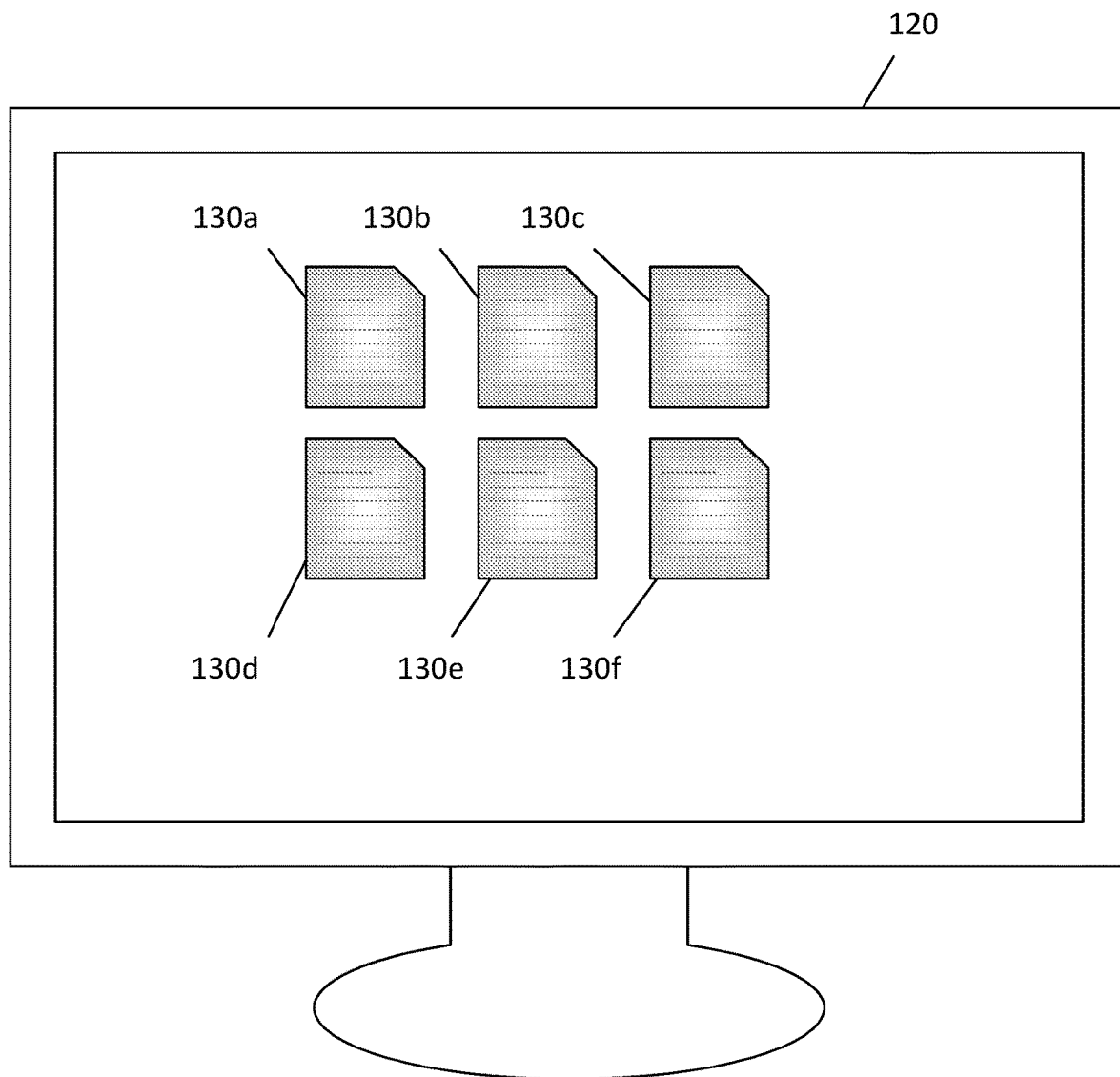
FIG. 6 is a schematic of a computer display.

The system is optimally utilized when the client device 100 utilizes multiple applications to create the client result which is sent by the user to the server 200. As shown in FIG. 5, in system performing this method there are multiple executable files 110a, 110b, 110c stored on the client computer 100. Each of the executable files 110a, 110b, 110c contains algorithms which have variables that are populated by the server computer 200. Referring to FIG. 6, the structure of the matrix is illustrated. The client device 100 utilizes a display 120. The display 120 presents a matrix of icons 130a-f The matrix of icons 130a-f may be presented in any format. The matrix of icons 130a-f may be presented as an entire set all at once or subsets of the matrix of icons 130a-f may be presented in sequential order. There may be any number of icons presented in the matrix of icons 130a-f Each icon is connected to one of the executable files 110. The matrix of icons 130a-f may be 4×4, 3×4, 5×5, randomly presented, or in any number and shape.

Figure 7:
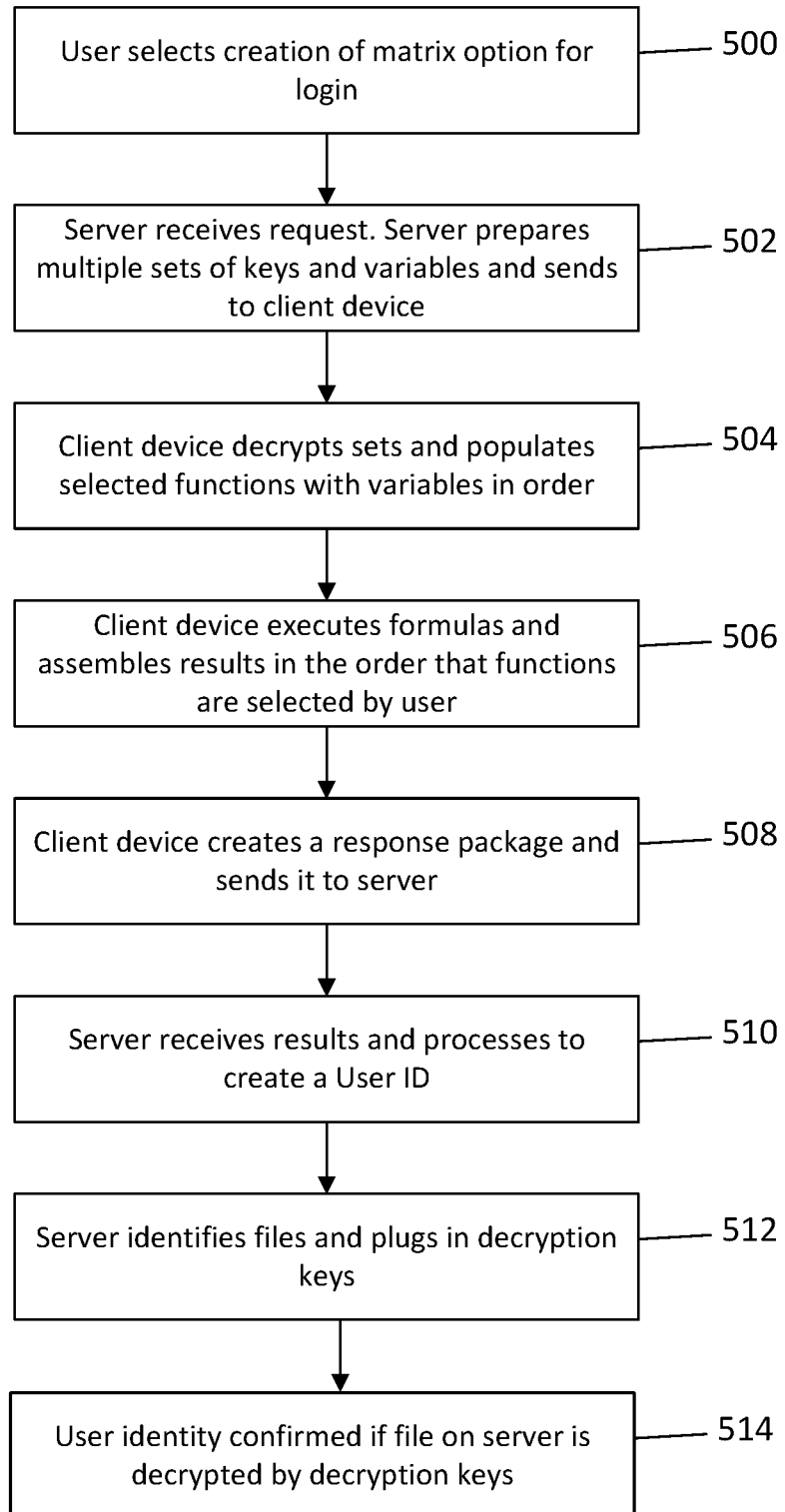
FIG. 7 is a schematic of the inventive method.

Referring to FIG. 7, the process of utilizing the matrix of icons 130a-f is illustrated. First, the user selects the option for the creation of the matrix option for login 500. The server receives the request and prepares multiple sets of keys and variables that are sent to the client device 502. The client device decrypts the sets and populates the selected functions with the variables in the order selected 504. The client device executes the formulas and assembles the results in the order that the functions are selected by the user 506. The client device creates a response package and sends it to the server 508. The server receives the results and processes it to create a User ID 510. The server identifies the files and plugs in the decryption keys 512. The user identity is confirmed if the file on the server is decrypted by using the decryption keys 514.

For example, the first executable file 110a may have any icon 130 attached to it. The icon 130 may be a picture selected by the server 200 or may be a picture selected by the user on the client computer 100. The first executable file 110a may be represented on the display 120 by the first icon 130a, the second icon 130b, or any other icon. If the first executable file 110a is connected to the first icon 130a then when the user selects the first icon 130a then the client executes the first executable file 110a.

When the user desires to login using the matrix selection, the user must run multiple executable files 110a, 110b, 110c in a predetermined order. The server 200 sends three sets of variables to be populated into algorithms in the executable files 110a, 110b, 110c. For example, if during the setup of the matrix option, the user decides to set it up so that the user must execute the third executable file 110c first, the second executable file 110b second, and the first executable file 110a last, then the user must always execute the executable file 110 in that order when going through the authentication process. In this example the user must select the third icon 130c first, the second icon 130b next, and the first icon 130a last. If the user selects any other icon 130, or selects the correct three icons 130 but in the wrong order, then the user is unable to sign into the server 200.

In the example above, when authenticating, the server sends three sets of variables to the client computer 100. When the user selects the third icon 130c, the third executable file 110c populates the first set of variables into the algorithms of the third executable file 110c and generates a result. When the user selects the second icon 130b, the second executable file 110b populates the second set of variables into the algorithms of the second executable file 110b and generates a result. When the user selects the first icon 130a, the first executable file 110a populates the third set of variables into the algorithms of the first executable file 110a and generates a result.

In one embodiment the results of one executable file 110 may be utilized in the operation of another executable file 110. The last executable file 110 then generates a correct result only if the results of prior executable files are utilized. In other embodiments the results of each executable file 110 are combined into a client results which is sent to the server computer 200. In this embodiment the results of one executable file 110 are not used in another executable file 110.

Figure 8:
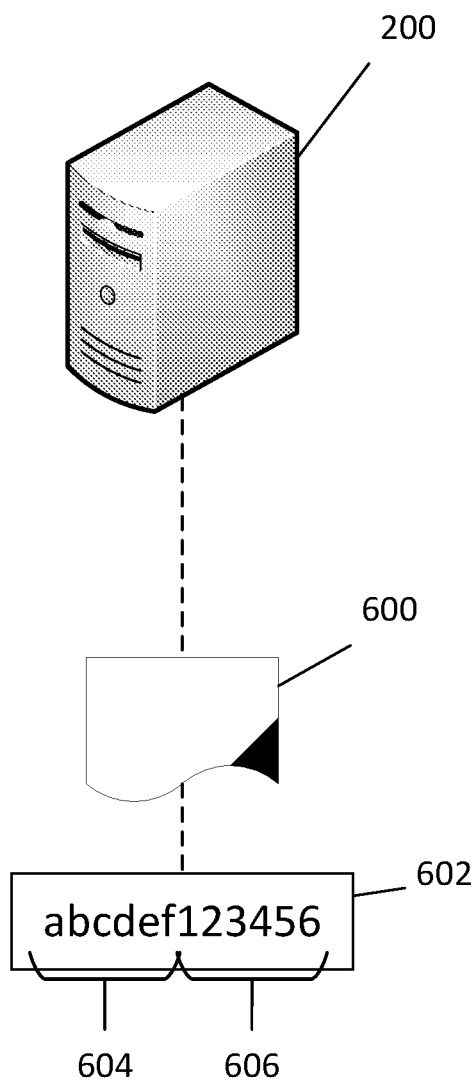
FIG. 8 is a schematic of the computer system.

Referring to FIG. 8, final verification is illustrated. In the final verification the server 200 creates a verification file 600 from the client result generated by the executable file 110. The name of the verification file 600 has a verification file name 602. The verification file name 602 has two parts. The first part is a file name 604 and the second part is a decryption key 606. If the decryption key 606 unlocks the file name 604 then the client device 100 is verified and the user is granted access to the server 200. If the server 200 gets the wrong client result then the verification file name 602 is inaccurate. If it is inaccurate then the decryption key 606 will not unlock the file name 604. In this instance the user identity is not confirmed and the server 200 does not grant access to the user.

To utilize the system, the user must register the client device 100 with the server 200. The method is dependent on the specific client device 100 utilized. A user may login to the server 200 only from a first client device 100 once the client device 100 is registered with the server 200. If a user attempts to utilize a separate client device 100 to login to the server 200, the login will fail because the user must only use the first client device 100.

The system is device centric in that the specific client device 100 is utilized to login to the server 200. The database 210 indexes the registered client devices by the device serial number, UDID, or IMEI (herein referred to as device profile).

The server 200 indexes the client device serial number, UDID, or IMEI (herein referred to as device profile) by processing it through an obfuscation and parsing algorithm. That algorithm will vary between devices, types and iterations, but will consistently produce the same obfuscated output such as a hash file name, encryption passphrase and/or encryption key unique for that device's device profile. The obfuscation eliminates a direct correlation between a device profile or identity and the file name except through the obfuscation algorithm.

Each user and client device 100 must first be "paired." Once paired any attempt to use the device credentials for authentication of a previously paired device (another account or device) would fail. Also any attempt to spoof a legitimate user authentication and device would fail.

Additionally during the account creation certain algorithms or processes are included to prevent an unauthorized user to spoof the server's identity to update or change the user's pairing, formulas, files or software used in the authentication process.

The user's client device 100 does not store login credentials but rather builds a unique set of run-time credentials each time the user logs in. Portions of the credentials are 1) unique to each 'user-and-device' pair and additional portions are 2) unique to each login from the same device. Because portions of every login are uniquely and randomly created between the device and server for each run-time, a fraudulent user would not be able to spoof the authenticated user or re-use previous successful authentication credentials.

Because the authentication credentials are not a whole value or stored as a complete ID on either the server 200 or the client device 100, the client device 100 portions must be first compiled, encrypted and sent over a secure socket layer or similar secure channel to the server. The information being encrypted is protected during transmission. The server decrypts portions of the device package and uses the information received to complete the build of the user authentication credentials on the server. At the same time the server uses randomly generated variables sent and received with the device to mathematically create a run-time authentication data stream from the user device.

Once the user's stream is processed, a complete suite of encryption keys are invoked so that all validations may be individually encrypted/decrypted using multiple keys of a key set. This means part of the information received from the device is decrypted and used as the 'user unique identity' and other portions to decrypt and build the server portion of the authentication 'user unique encryption keys'. Files in the server are encrypted/decrypted using a set of encryption keys unique to that user and that file, meaning every file has its own set of encryption keys which do not work on any other file. The server assigns hashed file names generally called UUID (for Universally Unique ID) to all files.

The server next creates mathematical formulas for the user files with one formula per file. The formulas are set using complex math algorithms, random numbers, serial numbers, user ID or other pieces of information available from the user and client device 100. Variations can exist to accommodate various devices and configurations.

The formulas populate the files and are linked to the images. Each formula consists of one or more operations (such as multiply, divide, radical function, addition, subtraction), one or more constants, and three or more variables. In other embodiments there may be less than three variables. An example of such a formula utilized, for illustrative purposes only and not to limit the scope of the claimed invention, is illustrated below:

$$\frac{-v1 \pm \sqrt{a^2 - 4c}}{bv2}$$

In this example v1 and v2 are variables and a, b and c are constants.

The algorithms utilized are specific to that user and that client device 100. The server 200 populates the formulas and algorithms with constant values unique to that user. The server 200 selects the values to be utilized at each run time login. Therefore during each run time, the server utilizes a separate and unique set of variables. The server 200 may encrypt the formulas or files with a unique server and unique user keyset. During login this additional security encryption step may be used to harden the security or to identify a single user from multiple users on a single device.

The server 200 may also include its own IP address or the server 200 into the algorithms and formulas for both the client device 100 and server 200 to prevent spoofing of the server. The server 200 compiles the formulas, IP, keys and files into an installation package and sends it to the client device 100. The client device 100 accepts and runs the installation package. The client device 100 reports back to the server 200 with additional information to verify success and complete the creation process.

The user visits the site and requests a new identity authentication. The server 200 builds a preliminary installation package which will, when installed, provide the identity of the client device 100, or the device profile. The device profile may include IP address of the server for authentication of software updates, UDID, serial number of the device or components and special ID tokens the needed to augment the device's unique identity.

The server 200 encrypts and sends the client device 100 the preliminary package. The preliminary installation package collects data from the client device 100 to generate the device profile, including the data above, device manufacturers make, model, date, serials, encryption/decryption keys and additional data as necessary. The client device 100 encrypts the package for its unique identity and sends it securely to the server. The server 200 decrypts the package and builds a user ID set of obfuscated files and encryption keys, starting with a UUID (Universal Unique ID) file name set for that user.

The server 200 then selects a set of formulas, which when run on the device and server, will be used to identify the user. The server 200 assigns the formulas to files, which will be assigned to icons or pictures in a matrix once the user picks the matrix and picture icons. If additional data is required to provide authentication then the server 200 requests it at this point in time.

The user device provides the data for the identity. The user completes the on line portion of identity creation. The server 200 assembles the user identity data into a 'whole ID' set of files and keys. The server 200 assigns formulas to pictures for matrix, assigns constant values for formulas and sets unique pairing identity including encryption keys, UUIDs for files, etc. The User selects pictures for matrix and completes the requisite identity form. The server assembles and creates files, encryption keys, and places the files in obfuscated records with UUIDs and encrypts those with encryption keys which are derived from the user device ID such as the IMEI and the results of the formulas sent to the device. Once the package is complete the association of the keys and UUIDs are wiped from the server.

The server 200 completes the installation package of the files, including files, images, formulas, encryption keys and encrypted data for user selected unique files, data and formulas. The server 200 saves the encrypted user identity in an obfuscated file name. The server 200 sends the client device 100 the final installation package. The user then installs the identity package which places files and programs on the client device 100 completing the account creation.

Figure 4:
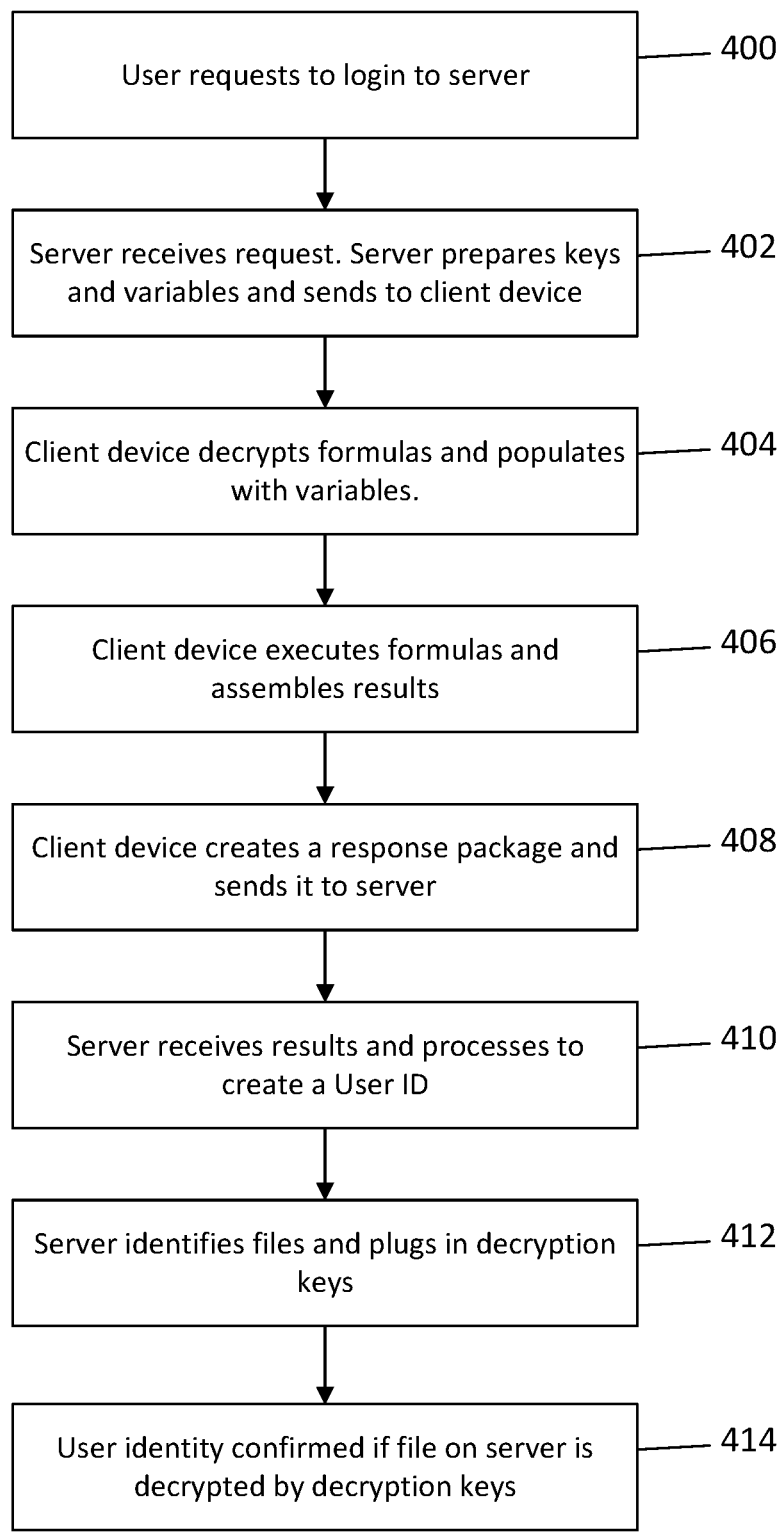
FIG. 4 is a schematic of the inventive method.

Referring to FIG. 4, the process of authenticating a user is illustrated. First, the user sends a request to the server to login 400. The server receives the request and prepares the variables and sends those to the client device 402. The client device decrypts the formulas and populates them with the provided variables 404. The client device executes the formulas and assembles the results 406. The client device creates the response package and sends it to the server 408. The server receives the result and processes it to create a User ID 410. The server identifies files and plugs in the decryption keys 412. The user identity is confirmed if the file on the server is decrypted by the decryption keys 414.

The authentication of the user depends on the server 200 successfully recreating the user's obfuscated file name and encryption keys. The server 200 uses the derived file name and keys from data sent to the device and the results returned from the user to locate the user file and decrypt the user credentials on the server. Authentication is the process where the user is paired to the device and the user-device pair is then paired to the server's provisioning of the unique user account. All data is encrypted with each element using different encryption keys.

When the user wants to authenticate a login they run a client side application. The client side application creates a matrix of images each tied to a formula or function and sends the server a request for variables and encryption keys to access the underlying formulas and programs. The server 200 provides a set of variables with the appropriate number to populate the entire matrix of formulas and any keys to decrypt. The client device 100 decrypts and populates all the formulas. The user selects the formulas which they call from pictures—in order—from the matrix of pictures. The client device 100 runs the selected formulas and creates a file with the results assembled in the order the user selected the pictures and any additional data required to complete the process. The client device 100 sends the product or mathematical results of those formulas along with the other data, in either a single or multiple encrypted files.

The server 200 decrypts the data and parses it in order to populate algorithms. The server 200 takes the IMEI and uses it to recreate the obfuscated user file ID. The server 200 takes the results of the formulas and populates an algorithm which then reproduces the encryption keys for that user's files. The keys created in this step are used to decrypt the user's identity held in the hashed file name and previously encrypted. When user file and keys match the identity is confirmed. When the user selects the wrong device or wrong sequence of formulas it fails.

When the user runs the client application it sends IMEI and other data to the server 200 and requests variables to populate the formulas. The server 200 builds a package including variables, encryption/decryption keys and file names—all based on the device centric request. The server 200 sends the package to the client computer 100. The client computer 100 builds the picture matrix and the user selects icons which run the programs to build the identity. The client computer 100 decrypts the package and runs any programs necessary to compile a verification of identity. The client computer 100 takes variables and populates the formula. It calls any sub routines and programs necessary to encrypt/decrypt data and runs the programs in an order determined by the authentication program and the user's input.

The client computer 100 executes the formulas and assembles the results into a package. The results package is assembled with additional data which may also include UUIDs, formula numbers, serials, Manufacturer ID, Model, Date, serial, IP address and any data necessary for authentication. It sends the package to the server 200 in an encrypted package.

The server 200 decrypts the package and parses the data into the individual elements. The server 200 obfuscates/deobfuscates parsed elements to find the UUIDs of the server files containing the user identity. The server obfuscates/deobfuscates the encrypted keys to unlock the UUID named files. It takes the mathematical results of the formulas returned by the device and runs a similar math algorithm to produce a unique numeric identity.

The validity of the formulas for that user are extracted from that process which is a set of encryption keys necessary to unlock the files associated with that user. The server applies the results, deobfuscation and re-creates the user file names, keys and other data to unlock the user ID. When the data is correct the user is granted authorization. If the data is incorrect the user is denied authorization. There is no stored matching token on either the client computer 100 or server 200.

In the primary embodiment of the invention portion of the login identity process is secured by transferring and authenticating a part of the login process to the client device 100. The process requires a pairing of the client device 100 to the server 200 and further pairing the user to the client device 100 such as a cellphone, tablet computer, or desktop. The server 200 and client device 100 are paired where the device unique ID, or device profile, such as a IMEI, UDID, Bios or Memory serial number is used to identify the hardware and the server IP is used to prevent misdirection of the user by a nefarious agent spoofing the server. The user selects a set of files—presented in the form of a grouping or matrix of pictures of files. The files are given a UUID in the form of a unique hash file name. The file name may also be used as public or private keys for encrypting data and files and/or may contain public or private keys for encrypting data.

Authentication files contain mathematical formulas and other unique data. These formulas are made of three elements: operations such as add or subtract, a set of constant values such as 7.3 or 5.04, and a set of variables which are number values which are populated during login and sent by the server. The original authenticating server's static IP address, such as a bank or other service, is woven into the encryption keyset or obfuscation algorithm so that any attempt to spoof the server would cause an incorrect generation of keys.

Files with the encrypted formulas, keys and UUID are sent to the client device 100. When the user logs in, the device unique ID, or device profile, such as a IMEI, UDID, Bios or Memory serial number are sent to the server 200. The server 200 provides the client device 100 a set of variables. Those variables populate the formulas on the client device 100.

The client device 100 processes the formulas and returns to the server 200 a string which may include the file name, additional data and the results or product of the formulas. The server 200 uses the device ID, filenames and results to populate server's resident formulas, algorithms and process to derive the user's ID file and keys and to decrypt it. The process relies on client device 100 and user paired identity and derived encryption key sets to eliminate the need to store the user ID (user name and password) on either the client device 100 or the server 200.

The user authenticates himself using one of these methods on the client device 100: selection of some image or icon on their device. Each image, icon, numeric etc., links to an executable file. The icon launches programs from files, each of which has hashed file names. These programs create the unique run-time identity. No two files on any device may have the same hash name or the same formulas.

The hash file name may be used as keys on the server to identify files, to encrypt and decrypt the server formulas, or as constants used in formulas. The hash name may be the public or private key for the user. Thus, each device has multiple files. The files have formulas and their names may be used as encryptions keys. Files may have two or more unique sets of encryption keys.

Each client device 100 and user pair also has different set of server private keys. Files on the server 200 being different than files on the device. That account specific user private key along with the hash file name work together in an algorithm to produce a public/private key set to encrypt and decrypt the user's profile. Variations in manufacturers device limits and abilities require variations in the location and type of encryption keysets. No two identities have the same set of keys. No two client devices have the same set of keys. Thus each icon, user and device has their own keys. The server and device handshake to re-create an ID and keys as a run-time algorithm to access the user's identity. And each time a user logs in from the same client device 100 the variables and client results are different.

In some embodiments the user profile data such as name, SSN, CC, info, DOB etc. is held in an encrypted file on the server. The file is encrypted with the user's unique public and private keyset and hash file name. The device file names and device ID are used to identify the device during login and the keys which are created during the login process are used to decrypt the user specific file on the server. During the login process, the client device 100 runs a sequence of programs to compile formula employing run-time variables sent uniquely from the server 200. The results create a binary string. That string, once created by the user, is then sent to the server 200.

In summary, each client device icon assembles a unique string consisting of file names, mathematical formula results, and may include additional device specific data and encryption keys. The data on each user device can't be replicated or predicted on another device because the device ID, file names, formulas, run-time variables, encryption keys and run-time results are unique for each login.

In other embodiments of the invention, the server 200 creates and pairs with the client device 100 to establish a user and device identity package and sends it to the client device 100 using an SSL session (or other secure channel) initiated by the device during initial pairing.

First, the client device 100 must send to the server a device profile (UDID, IMEI, Bios Serial, OS serial, or other identity such as device Mfg, Model and SN). The server 200 creates an installation package. That package includes the software, formulas, files—encrypted and not, device identity process requirements and user identity process (user selection of images for example).

When an authentication is requested by the client device 100, the server 200 sends a string of randomly generated numeric variables. When the client device 100 returns the file names, results of processing the formulas and additional information such as the original authentication server's IP address vs the current server's IP address, the server 200 computes a user ID or file name and also a set of public and private keys necessary to decrypt the user ID file. The server 200 may use portions of the installation files, encrypted or not, and may include the device profile, such as UDID, IMEI, Bios Serial, memory serial or other device unique serial, OS serial, other identity such as device Mfg, Model and SN, or other identity information such as correct user's answers, files, numbers, images, file names, UUID, file content Once the server 200 has processed the information it retrieves the file and using the encryption keys it built from the results of the client device 100 solving the device formulas with provided run-time variables. The server 200 may request that additional files or information be sent to confirm the client device 100 is not compromised, or the user device is spoofed.

When records match (i.e. the file ID and the keys unlock the file) authentication is complete. When they do not the login request fails. The server 200 has no files or records necessary to match user ID or password-token.

The inventive system and method has a number of advantages over the prior art. Because the IMEI is different on every device, the account name cannot be changed by the user. This benefits the user because the user does not have to remember the specific username to access information stored on the server and database. Furthermore, the login is dependent on the IMEI of the specific device being utilized so there is no way that a nefarious user can guess or simulate the IMEI of the authorized user's device.

The inventive system and method is a further improvement over the prior art because the result of the formula utilized at the time of sign in is dependent on a run-time set of variables provided by the server. Therefore, any falsification attempts of nefarious users who use results obtained from previous sessions result in failure and sign in is prevented. Additionally, the formula utilized by each client device is unique to that client device. Therefore, the login identity is protected from brute force attacks. Furthermore, because the database connected to the server does not need to store a master login file or set of files containing matching tokens, less storage is needed and the server can operate faster during the login process.

In the event of a wholesale data breach, where all files in the entire database are stolen, each file has an obfuscated file name. This means that there is no common marker to show the contents of the file. Each file requires two encryption keys unique to that file to open it. None of the keys or device profiles are stored on the server 200 so no reference can be presumed or stolen.

The obfuscation of the file names may be through any number of processes. The obfuscation may be completed by performing a hash of file names. In other embodiments the file names may be salted by adding additional data to the file name. In another embodiment the file name undergoes a data masking process to alter the file name.

Because encryption keys are created at the time of setup and recreated on each login there is no need to store keys, usernames, passwords, or tokens. This decreases the amount of database storage needed for login information and utilizes less processing power searching for proper files during the login process.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of registering a user and client device pair, a server performing the steps of the method comprising:
 a) receiving from the client device a user profile and a device profile;
 b) building a user ID file, an encryption key, and a decryption key based, at least in part, on the user profile and/or the device profile;
 c) selecting a set of formulas;
 d) receiving from the client device a user ordered icon selection;
 e) assigning uniquely each formula of the set of formulas to each icon of the user ordered icon selection;
 f) encrypting the user ID file with the encryption key; and
 g) generating a hashed file name for the user ID file, wherein generating a hashed file name comprises generating a hashed file name comprising the decryption key.

2. The method of claim 1, wherein selecting a set of formulas comprises selecting formulas comprising variables and constants.

3. The method of claim 1, further comprising generating a set of icons and forwarding the set of icons to the client device.

4. The method of claim 1, wherein generating a hashed file name further comprises generating a hashed file name comprising a file name associated with the client device.

5. The method of claim 1, further comprising generating an installation package comprising the ordered icon selection and the set of formulas.

6. The method of claim 5, further comprising sending the installation package to the client device.

7. The method of claim 1, wherein generating a hashed file name further comprises generating a hashed file name comprising a file name associated with the user profile.

8. The method of claim 1, wherein generating a hashed file name further comprises generating a hashed file name comprising a file name associated with the client device and the user profile.

9. The method of claim 1, further comprising sending the set of formulas to the client device and sending random values to the client device to populate variables of the set of formulas sent to the client device.

10. The method of claim 9, further comprising receiving from the client device a plurality of results, wherein the results are obtained by the client device by evaluating the set of formulas with the random values.

11. The method of claim 10, further comprising building the decryption key further based at least in part on the plurality of results received from the client device.

12. The method of claim 1, further comprising configuring the decryption key to facilitate verification of the client device, wherein if the decryption key unlocks the verification file name the client device is verified.

13. A system for registering a user and client device pair, the system comprising:
    a server;
    a verification file stored on the server;
    the server configured to:
        receive from the client device a user profile and a device profile;
        build a verification file, an encryption key, and a decryption key based, at least in part, on the user profile and/or the device profile;
        select a plurality of algorithms, each of the algorithms comprising one or more formulas;
        receive from the client device a user ordered icon selection;
        assign uniquely each formula to each icon of the user ordered icon selection;
        encrypt the verification file with the encryption key; and
        generate a hashed verification file name for the verification file, wherein the hashed verification file name comprises the decryption key.

14. The system of claim 13, wherein at least some of the formulas comprise variables and constants.

15. The system of claim 13, the server further configured to generate a set of icons and to forward the set of icons to the client device.

16. The system of claim 13, wherein the hashed verification file name comprises a file name, the file name associated with the device profile.

17. The method of claim 13, the server further configured to send the set of formulas to the client device, and the server further configured to send random values to the client device to populate variables of the set of formulas sent to the client device.

18. The method of claim 17, the server further configured to receive from the client device a plurality of results, wherein the results are obtained by the client device by evaluating the set of formulas sent to the client device with the random values.

19. The method of claim 18, the server further configured to build the decryption key further based at least in part on the plurality of results received from the client device.

20. The method of claim 13, the server further configured to build the decryption key to facilitate verification of the client device, wherein if the decryption key unlocks the verification file name the client device is verified.

* * * * *